Jan. 19, 1954  C. W. WULFF  2,666,636
VEHICLE SPRING SUSPENSION
Filed March 8, 1951  2 Sheets-Sheet 1
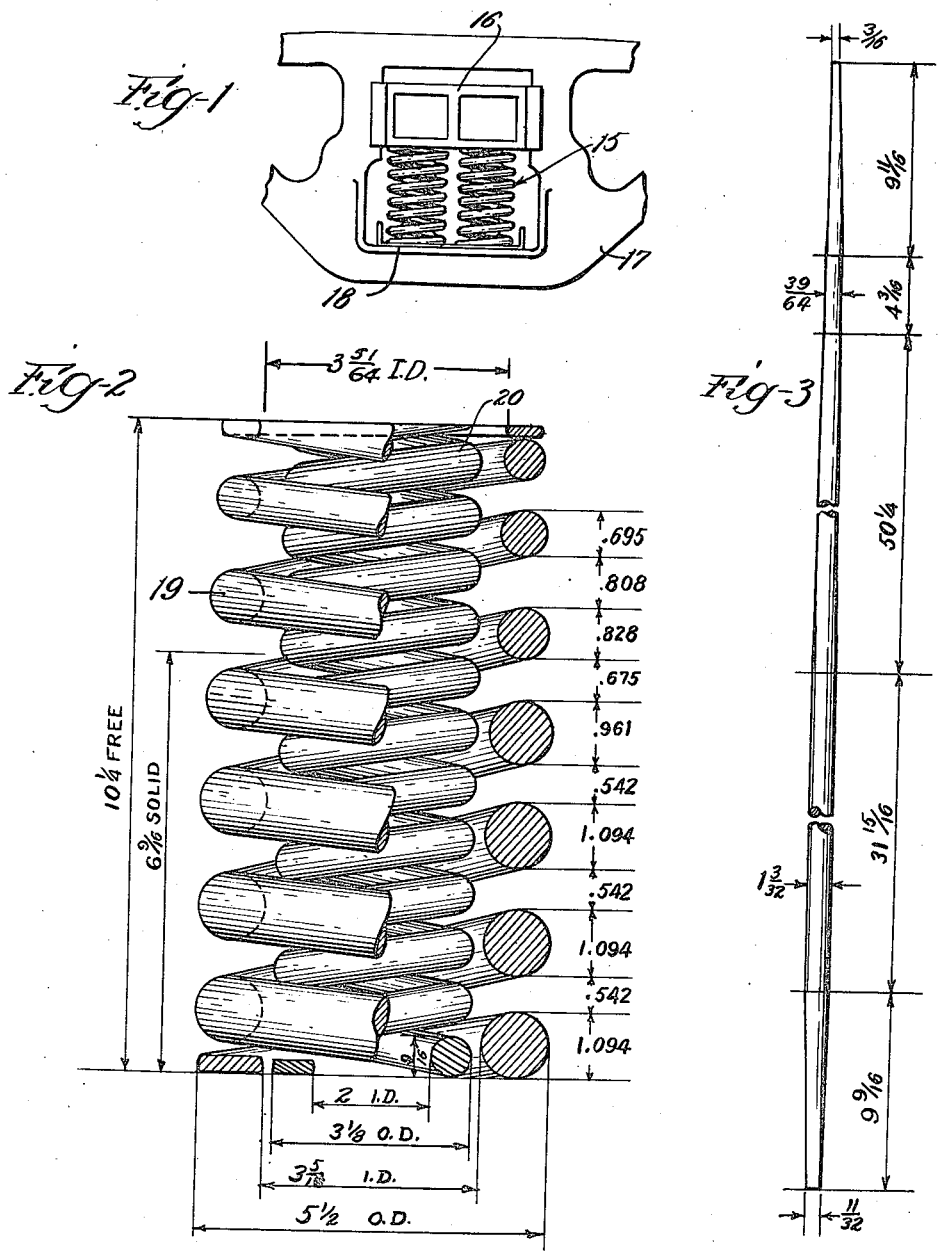
INVENTOR.
Cal W. Wulff.

Jan. 19, 1954    C. W. WULFF    2,666,636
VEHICLE SPRING SUSPENSION
Filed March 8, 1951    2 Sheets-Sheet 2
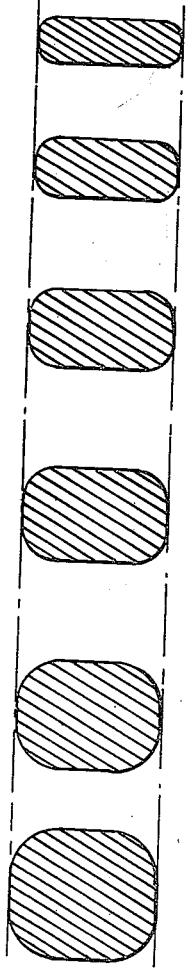
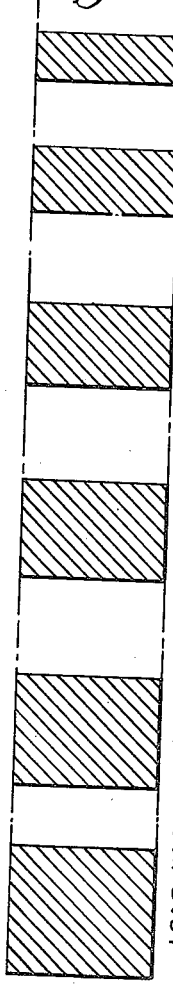
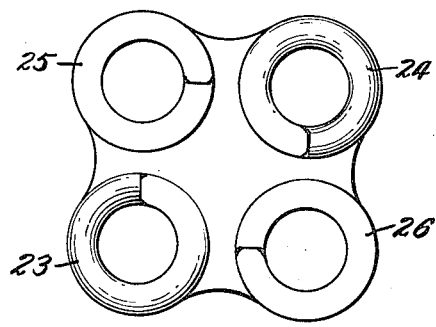
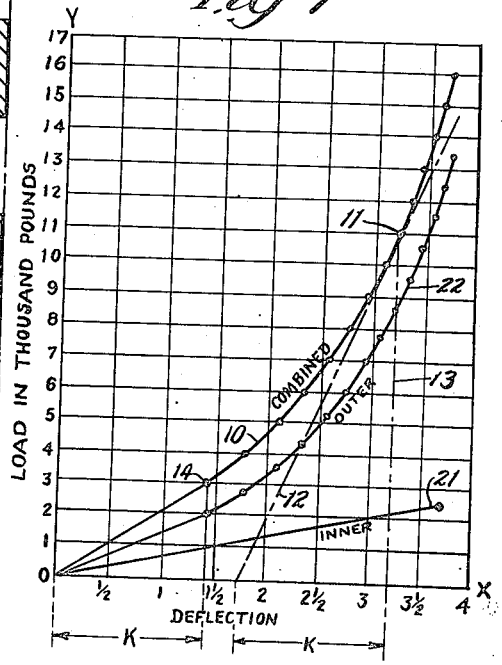
INVENTOR.
Cal. W. Wulff
BY Patented Jan. 19, 1954

2,666,636

UNITED STATES PATENT OFFICE 2,666,636

VEHICLE SPRING SUSPENSION

Cal W. Wulff, Chicago, Ill., assignor to Holland Company, a corporation of Illinois Application March 8, 1951, Serial No. 214,543

5 Claims. (Cl. 267—4)

This invention relates to spring suspensions for vehicles, particularly railway car trucks, and the principal object of the invention is to provide a simple and practical way to provide a spring suspension that is characterized by constant effective static deflection, a term that will hereinafter be defined in detail, but which in a practical sense means that the suspension has a constant frequency, regardless of the working load on the suspension.

Further and other objects and advantages will become apparent as the disclosure proceeds, and the description is read in conjunction with the accompanying drawings, in which Figure 1 is a fragmentary side elevational view of a railway car truck embodying the present invention;

Figure 2 is an enlarged side elevational view of a spring unit embodying the teachings of this invention and with specific dimensions given for the purpose of illustrating a particular application of such teachings to the fabrication of a railway car spring;

Figure 3 shows the shape and dimensions of the outer spring of Figure 2 before coiling;

Figure 4 is a view looking down upon the spring units constituting the components of a spring assembly and showing another embodiment of the invention;

Figures 5 and 6 illustrate other cross-sectional shapes which may be used for the variable rate springs; and Figure 7 is a load-deflection graph that will be be used in explaining the theory which underlies the invention.

Although certain specific adaptations of the invention will be used in describing and explaining the invention, it will be understood that the invention may take other forms within the scope of the appended claims.

The invention has particular applicability to railway freight cars and for convenience will be described with reference to such use.

When a freight train is traveling over track, the passage of each wheel over a rail joint imposes a load on the associated spring assembly, and, if the train is traveling at a speed such that the rate at which the evenly spaced rail joints impart a blow to the spring assembly is coincident with the period or frequency of the spring assembly for its particular loading, the spring will tend to build up oscillations which may reach amplitudes that will cause the spring to go solid, or throw the bolster off the spring suspension.

Obviously, when the frequency of the rail joint impact corresponds to the frequency of the truck springs so that large amplitude oscillations are set up, the car lading is oftentimes damaged and the car itself is subjected to severe stresses that may cause damage to the car.

With ordinary freight car spring suspensions having constant rate springs (i. e., springs having a straight-line load-deflection curve), the frequency of oscillation of the spring depends upon its static deflection, and, since the component cars of a freight train are not equally loaded, each car will have a critical speed for its particular loading at which these undesirable high amplitude oscillations will be set up by rail joints. Hence, in a conventional freight train, it is expected that certain cars will be "bouncing" regardless of the speed of the train, due to the correlation between the speed of the train and the natural frequency of the springs for these cars at their respective loadings.

Inasmuch as the period of a spring varies with its static deflection, the period may be made constant if the spring is constructed so that it has what is termed a constant effective static deflection, and this may be accomplished by having the spring have load-deflection characteristics that are defined by the formula $$f = K \, \text{Log}_e \frac{W}{1000} + C$$

wherein:

$f$ = deflection
$K$ = the constant effective static deflection
$W$ = the load in thousand pounds
$C$ = the constant of integration
$\text{Log}_e$ = Napierian logarithms in which the base is 2.718281828.

Referring to Figure 7, the curve 10 represents the load-deflection curve for a spring suspension that follows the formula $$f = K \, \text{Log}_e \frac{W}{1000} + C$$

in which K is arbitrarily taken as 1.38 inches. The constant K by definition is considered to be the distance along the X axis between the intercepts of a normal to the X axis and a tangent to the curve taken with respect to the same point on the curve. In other words, taking any point 11 on the curve 10 and drawing a tangent 12 to such point and dropping a normal 13 from the same point to the X axis will produce intercepts on the X axis that are K distance apart, and this is true for any point on the curve 10 lying above the point 14. Between the origin of the curve and the point 14 (which has an abscissa K) the curve 10 is a straight line.

Since the distance between the intercepts on the X axis of a tangent to the curve and a normal to the X axis drawn with respect to any point 11 lying above the point 14 on the curve results in a constant K, this characteristic of the spring suspension may be termed constant effective static deflection, and it should be understood that throughout the specification and claims the term is used in this sense as it applies to any particular spring suspension.

When a spring suspension is constructed to follow the curve 10 so that it is characterized by its constant effective static deflection within its working range, it has been determined theoretically and empirically that the period of the spring within such range remains constant regardless of its deflection or loading. As a result, a spring suspension having this characteristic has but one critical frequency, which means that there is but one speed at which rail joint impacts will cause resonant vibration of the spring suspension and produce the undesirable high amplitude oscillations. If all freight cars making up a given train were equipped with spring suspensions having the same constant effective static deflection, and hence the same period of oscillation regardless of load, the engineer of the train could easily avoid such critical speed (except momentarily) and thereby prevent damage to the cars and to the lading through resonant vibration of the spring suspensions. Even when used with single freight cars, the effect of constant effective static deflection is to provide a softer ride, particularly for relatively light ladings.

In any given spring suspension, and particularly as applied to railway freight cars, space limitations usually dictate the size, shape and arrangement of the springs. Conventionally, the spring suspension 15 for a truck bolster 16 within a side frame 17 comprises two or more spring units, collectively called a group, with each unit comprising one or more individual springs extending from the bolster 16 to the spring seat 18.

According to the present invention, regardless of the number of springs, spring units or spring groups that may be employed in supporting the bolster 16 on the side frame 17, the composite spring suspension, which is generally designated 15 must conform generally to the curve defined by the formula $$f = K \operatorname{Log}_e \frac{W}{1000} + C$$

and one feature of the present invention resides in the manner of achieving this result through the use of certain combinations of springs.

Let us suppose, first of all, that each unit of the spring suspension 15 shown in Figure 1 consists of an outer coil 19 and an inner coil 20. Let us suppose also that the desired load deflection curve for this combination of two springs shall conform with curve 10 in Figure 7 with the constant effective static deflection being taken at 1.38" for all loads between 3000 pounds and 16,000 pounds. Theoretically, it would be possible to make the springs 19 and 20 each of variable rate but designed so that their additive effect conforms to the desired characteristics for the spring suspension illustrated by curve 10. However, certain practical difficulties arise when attempting to construct the inner spring 20 of variable rate due to the smaller overall diameter of the spring and also the relatively small cross-sectional area of the upper turns thereof. Hence, according to the present invention, the spring 20 is made of constant rate and therefore has a straight-line load-deflection curve, such as shown at 21 in Figure 7, and for the purpose of illustration, it will be assumed that the spring is made of $\frac{15}{16}$" round stock with a free height of 10¼", a solid height of 6⅛" and with a solid capacity of 2600 pounds.

With the curve for each spring unit given as the curve 10 in Figure 7, and with the inner spring 20 having a load-carrying capacity corresponding to the line 21 of Figure 7, it will be seen that by subtracting the curve 21 from the curve 10 the desired characteristics for the outer spring 19 may be obtained, which characteristics are represented by the curve 22. Applying known formulas used in the art of spring design, it may be determined that the outer coil spring 19, in order to have the characteristics of curve 22, may be coiled from a round bar shaped and dimensioned as shown in Figure 3, which after coiling is finally given the shape and dimensions indicated in Figure 2 for this spring.

A coil of this size and shape may be relatively easily fabricated, as compared to a variable rate spring of smaller overall diameter and smaller cross section of turns. Hence, a spring unit consisting of a constant rate inner coil 20, and a variable rate outer coil 19 made in accordance with the teachings of this invention can, when used with other like spring units forming the group making up the suspension 15, provide the desired characteristics of constant effective static deflection for the entire spring suspension.

Since variable rate springs are characterized by having certain coils go solid before other coils, it is desired in some instances to use relatively flat cross-sectional shapes, such as shown in Figures 5 and 6, in order to avoid stress concentrations as the coils go solid, and also to give the spring better vertical stability. It should be understood that the invention is not limited to any cross-sectional shape for the material making up the coil spring.

It should also be understood that in some instances instead of using an inner coil spring 20 of constant rate, the total load and space requirements for the spring suspension may permit the use of constant rate springs 23 and 24 (Figure 4) at diagonal positions in the group, and variable rate springs 25 and 26 in the other diagonal positions, the characteristics of the latter springs being such that when combined with the springs 23 and 24, the entire spring suspension will be characterized by constant effective static deflection. When the component units of the spring assembly, such as shown in Figure 4, permit single coils to be used in each unit, the arrangement works out satisfactorily, but if double coil units, such as shown in Figure 2, are necessary in order to provide the necessary spring capacity, each unit will preferably be made with a constant rate inner spring, such as shown at 20, and a variable rate outer spring, such as shown at 19.

Inasmuch as the development of curve 10 with its constant effective static deflection is of utmost importance to the practice of this invention, the following calculations will illustrate how the curve is developed, assuming by way of illustration that the effective static deflection is to be 1.38 for all loads between 3000 pounds and 16,000 pounds of lading.

In making the calculation, the value of $C$ is first determined by substituting 1.38 for $f$ and $K$ in the formula $$f = K \operatorname{Log}_e \frac{W}{1000} + C$$

as follows:

$$1.38 = 1.38 \operatorname{Log}_e \frac{3000}{1000} + C$$
$$C = 1.38 - (1.38 \times \operatorname{Log}_e 3)$$
$$= 1.38 - (1.38 \times 1.0986)$$
$$= 1.38 - 1.514$$
$$C = -0.134$$

Thereafter the points of the curve may be computed for different increments of loading, as follows:

```
3000 f=1.38×Logₑ  3+C=1.38×1.099  −0.134=1.380
4000 f=1.38×Logₑ  4+C=1.38×1.386  −0.134=1.779
5000 f=1.38×Logₑ  5+C=1.38×1.609  −0.134=2.086
6000 f=1.38×Logₑ  6+C=1.38×1.792  −0.134=2.339
7000 f=1.38×Logₑ  7+C=1.38×1.946  −0.134=2.551
8000 f=1.38×Logₑ  8+C=1.38×2.079  −0.134=2.736
9000 f=1.38×Logₑ  9+C=1.38×2.197  −0.134=2.898
10000 f=1.38×Logₑ 10+C=1.38×2.3026 −0.134=3.044
11000 f=1.38×Logₑ 11+C=1.38×2.398  −0.134=3.175
12000 f=1.38×Logₑ 12+C=1.38×2.485  −0.134=3.296
13000 f=1.38×Logₑ 13+C=1.38×2.565  −0.134=3.406
14000 f=1.38×Logₑ 14+C=1.38×2.639  −0.134=3.508
15000 f=1.38×Logₑ 15+C=1.38×2.708  −0.134=3.603
16000 f=1.38×Logₑ 16+C=1.38×2.773  −0.134=3.692
```

If some other constant effective static deflection value is chosen (instead of 1.38″), it is necessary to apply it to the given formula to ascertain whether total deflections within the working range of the spring suspension stay within reasonable limits, and if it does not, such value cannot be used.

A person skilled in the art will readily appreciate the advantage in being able to use constant rate springs to obtain a part of the required spring capacity, and variable rate springs of relatively large diameter in order to coact with the constant rate springs to provide the desired constant effective static deflection, and hence constant frequency for the composite spring suspension.

It will be understood that the choice of specific values for the constant effective static deflection and other spring design limitations or requirements is purely illustrative.

It should also be understood that in some practices of the invention either the constant rate spring or the variable rate spring, or both, may be other than coil springs, such for example as a volute spring or a Belleville spring.

I claim:

1. In a spring suspension, a plurality of springs acting in parallel to support a given load, one of said springs having a constant load-deflection rate and another having a variable load-deflection rate, the composite rates of said springs lying substantially on a curve defined by the formula $$f = K \, \text{Log}_e \frac{W}{1000} + C$$

in which
$f$=deflection
$K$=the constant effective static deflection
$W$=the load in thousand pounds
$C$=the constant of integration
$\text{Log}_e$=Napierian logarithms in which the base is 2.718281828.

2. In a spring suspension, a plurality of springs acting in parallel to support a given load, at least one of said springs having a constant load-deflection rate and another having a variable rate, the composite rates of all springs acting in the suspension lying substantially on a curve defined by the formula $$f = K \, \text{Log}_e \frac{W}{1000} + C$$

in which
$f$=deflection
$K$=the constant effective static deflection
$W$=the load in thousand pounds
$C$=the constant of integration
$\text{Log}_e$=Napierian logarithms in which the base is 2.718281828.

3. In a spring suspension, a plurality of springs acting in parallel to support a given load, at least one of said springs having a constant load-deflection rate and another having a variable rate, the composite rates of all springs acting in the suspension lying substantially on a curve defined by the formula $$f = K \, \text{Log}_e \frac{W}{1000} + C$$

in which
$f$=deflection
$K$=the constant effective static deflection
$W$=the load in thousand pounds
$C$=the constant of integration
$\text{Log}_e$=Napierian logarithms in which the base is 2.718281828, said constant rate spring being a helical spring.

4. In a spring suspension, a plurality of springs acting in parallel to support a given load, one of said springs having a constant load-deflection rate and another having a variable load-deflection rate, the composite rates of said springs lying substantially on a curve defined by the formula $$f = K \, \text{Log}_e \frac{W}{1000} + C$$

in which
$f$=deflection
$K$=the constant effective static deflection
$W$=the load in thousand pounds
$C$=the constant of integration
$\text{Log}_e$=Napierian logarithms in which the base is 2.718281828.

said constant rate and variable rate springs both being coil springs with the constant rate spring mounted concentrically within the variable rate spring.

5. For use with a parallel acting constant rate spring of a given constant rate, a variable rate spring of varying bar size coiled with a substantially uniform mean diameter and having a load-deflection rate, which when added to the load-deflection rate of said constant rate spring produces a spring suspension having a load-deflection rate corresponding to the formula $$f = K \, \text{Log}_e \frac{W}{1000} + C$$

in which
$f$=deflection
$K$=the constant effective static deflection
$W$=the load in thousand pounds
$C$=the constant of integration
$\text{Log}_e$=Napierian logarithms in which the base is 2.718281828.

CAL W. WULFF.

References Cited in the file of this patent

UNITED STATES PATENTS

| Number | Name | Date |
|---|---|---|
| 1,840,506 | Hankins | Jan. 12, 1932 |
| 2,045,299 | Hedgcock | June 23, 1936 |
| 2,105,651 | Holland | Jan. 18, 1938 |
| 2,267,153 | Holland | Dec. 23, 1941 |
| 2,378,097 | Piron | June 12, 1945 |
| 2,387,264 | Holland | Oct. 23, 1945 |
| 2,387,265 | Holland | Oct. 23, 1945 |
| 2,387,266 | Holland | Oct. 23, 1945 |